United States Patent
Di Lullo

(10) Patent No.: US 7,722,428 B2
(45) Date of Patent: May 25, 2010

(54) PULL TOY

(75) Inventor: Veronica Di Lullo, Diamond Springs, CA (US)

(73) Assignee: Midknight Creations, LLC, Diamond Springs, CA (US)

( * ) Notice: Subject to any disclaimer, the term of this patent is extended or adjusted under 35 U.S.C. 154(b) by 152 days.

(21) Appl. No.: 11/942,539

(22) Filed: Nov. 19, 2007

(65) Prior Publication Data

US 2008/0146116 A1   Jun. 19, 2008

Related U.S. Application Data

(60) Provisional application No. 60/875,219, filed on Dec. 15, 2006.

(51) Int. Cl.
*A63H 3/28* (2006.01)

(52) U.S. Cl. .................. 446/297; 119/707; D21/621

(58) Field of Classification Search ............. 446/297, 446/369; 119/707
See application file for complete search history.

(56) References Cited

U.S. PATENT DOCUMENTS

| | | | | |
|---|---|---|---|---|
| 699,780 A | * | 5/1902 | Woerner | 446/72 |
| 854,224 A | * | 5/1907 | Lamprey | 446/386 |
| 1,388,677 A | * | 8/1921 | Weatherly | 446/369 |
| 1,606,070 A | * | 11/1926 | Gibson | 446/330 |
| 2,020,079 A | * | 11/1935 | Rabel | 446/297 |
| 5,340,217 A | * | 8/1994 | Rothman | 383/17 |
| 5,507,678 A | * | 4/1996 | Chiang | 446/369 |
| 6,581,493 B1 | * | 6/2003 | Gillane | 74/563 |
| 6,848,967 B2 | * | 2/2005 | Kim | 446/369 |
| 6,918,355 B1 | * | 7/2005 | Arvanites | 119/707 |
| 7,207,294 B2 | * | 4/2007 | Stasio | 119/707 |
| 2003/0211808 A1 | | 11/2003 | Yarbrough | |
| 2004/0102133 A1 | | 5/2004 | Yarbrough | |
| 2004/0200433 A1 | * | 10/2004 | Oblack | 119/707 |
| 2008/0146116 A1 | | 6/2008 | Di Lullo | |

* cited by examiner

*Primary Examiner*—Gene Kim
*Assistant Examiner*—Matthew B Stanczak
(74) *Attorney, Agent, or Firm*—Hickman Palermo Truong & Becker LLP

(57) ABSTRACT

In an embodiment, a pull toy comprises a body; a first limb element that is joined to the body; a second limb element that is joined to the body at an angle with respect to the first limb element; wherein the second limb element is joined to the body at about a linear midpoint of the second limb element and wherein the first limb element is joined to the body at about a linear midpoint of the first limb element.

19 Claims, 3 Drawing Sheets

PULL TOY

PRIORITY CLAIM; CROSS-REFERENCE TO RELATED APPLICATION

This application claims the benefit of and priority to prior U.S. provisional patent application 60/875,219, filed Dec. 15, 2006, the entire contents of which are hereby incorporated by reference as if fully set forth herein.

FIELD OF THE INVENTION

The present disclosure generally relates to toys for use by animals, specifically toys that one or more animals can pull upon.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some breeds of dogs appear to enjoy participating in pull games in which a dog grasps and pulls an object or toy using the dog's mouth while a person or another dog simultaneously grasps and holds or pulls the object or toy. Commercial pull toy products include knotted ropes and stuffed objects. The stuffed type of pull toy may resemble a small animal such as a duck, chicken, rabbit or squirrel. The stuffed type of pull toy typically comprises a plush fabric body with a polyester fiber filling or other stuffing with stuffed limbs that are sewn to a body. Velour or cotton is commonly used for the fabric body.

Unfortunately, most stuffed pull toys now on the market are easily ripped and destroyed by even a moderately aggressive dog. It is common for a dog to rip off one or two arms or legs of such stuffed pull toys in the first few minutes of use. To address this problem, some stuffed pull toys are now made with very short limbs or no limbs at all, which defeats the purpose of such a toy. Further, once a part of the stuffed pull toy is ripped or torn, the toy cannot be washed because the stuffing will come out.

SUMMARY

The invention is summarized in the appended claims. In an embodiment, a pull toy comprises a body; a first limb element that is joined to the body; a second limb element that is joined to the body at an angle with respect to the first limb element; wherein the second limb element is joined to the body at about a linear midpoint of the second limb element and wherein the first limb element is joined to the body at about a linear midpoint of the first limb element.

In an embodiment, the second limb element is joined to the body over the first limb element. In an embodiment, the first limb element and the second limb element each comprises a first sheet of a flexible sheet material joined along a perimeter thereof to a second sheet of a flexible sheet material. In an embodiment, a noisemaker is affixed between the first sheet and the second sheet.

In an embodiment, the body, first limb element, and second limb element comprise a linear density of fiber mass of 800 Denier. In other embodiments, material with different linear density of fiber mass may be used. For example, canvas or other sheet cloth material may be used and embodiments are not limited to the use of nylon or other synthetic materials. In an embodiment, the angle is between 5 degrees and 90 degrees. In an embodiment, each of the first limb element and the second limb element is elongated and comprises two unitarily formed limbs. In an embodiment, the pull toy further comprises a tail element and the first limb element, the second limb element, and the tail element comprise five simulated limbs.

In an embodiment, the first limb element and the second limb element are directly formed without stuffing.

In an embodiment, a pull toy comprises a body; a first limb element that is joined to the body; a second limb element that is joined to the body at an angle with respect to the first limb element; the second limb element is joined to the body at about a linear midpoint of the second limb element and the first limb element is joined to the body at about a linear midpoint of the first limb element; the first limb element comprises a first sheet of a flexible sheet material joined along a first perimeter thereof to a second sheet of a flexible sheet material; the first sheet is joined to the body over a first side of the body and the second sheet is joined to the body over a second side of the body.

In an embodiment, the second limb element comprises a third sheet of a flexible sheet material joined along a second perimeter thereof to a fourth sheet of a flexible sheet material; the third sheet is joined to the body over the first side of the body and the fourth sheet is joined to the body over a second side of the body. In an embodiment, the third sheet passes over the first sheet, and wherein the second sheet passes over the fourth sheet.

In an embodiment, the pull toy further comprises a tail element and the first limb element, the second limb element, and the tail element comprise five simulated limbs. In an embodiment, a noisemaker is affixed between the first sheet and the second sheet. In an embodiment, the first sheet and the second sheet are directly joined without stuffing. In an embodiment, the third sheet and the fourth sheet are directly joined without stuffing.

DESCRIPTION OF EXAMPLE EMBODIMENTS

Embodiments of improved pull toys are now described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
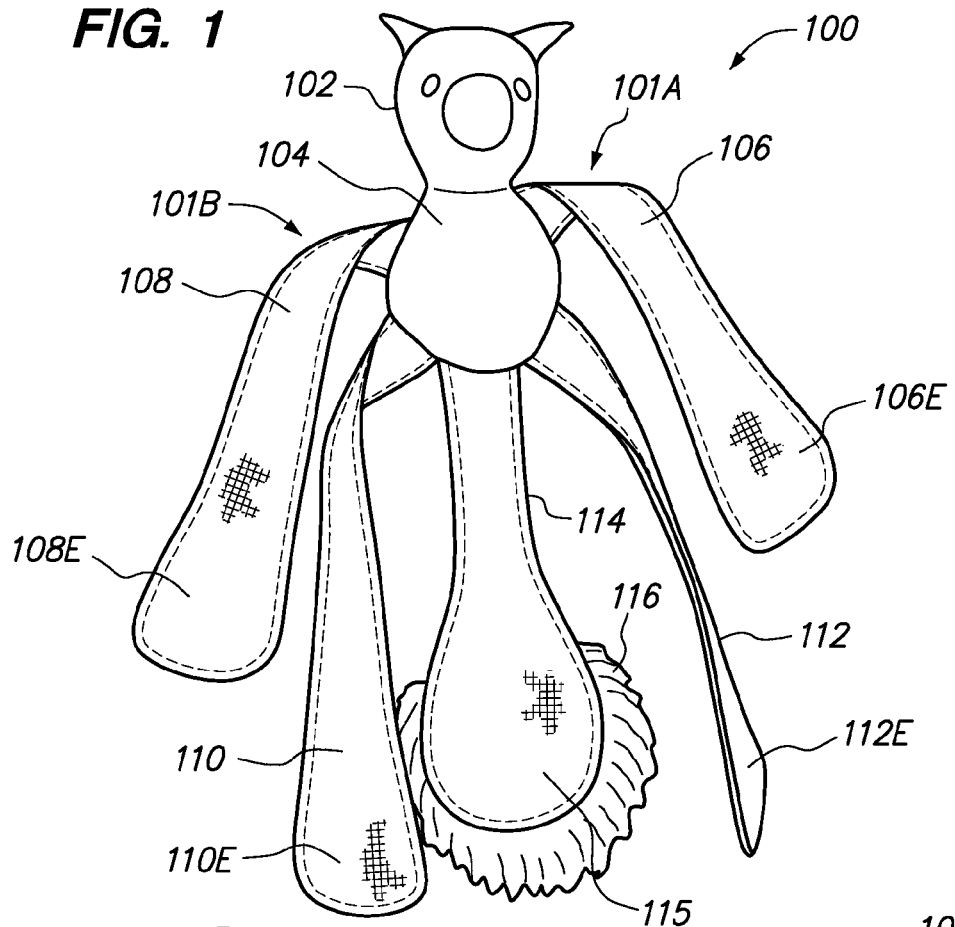
FIG. 1 is a front elevation view of an embodiment of a pull toy.
Figure 2:
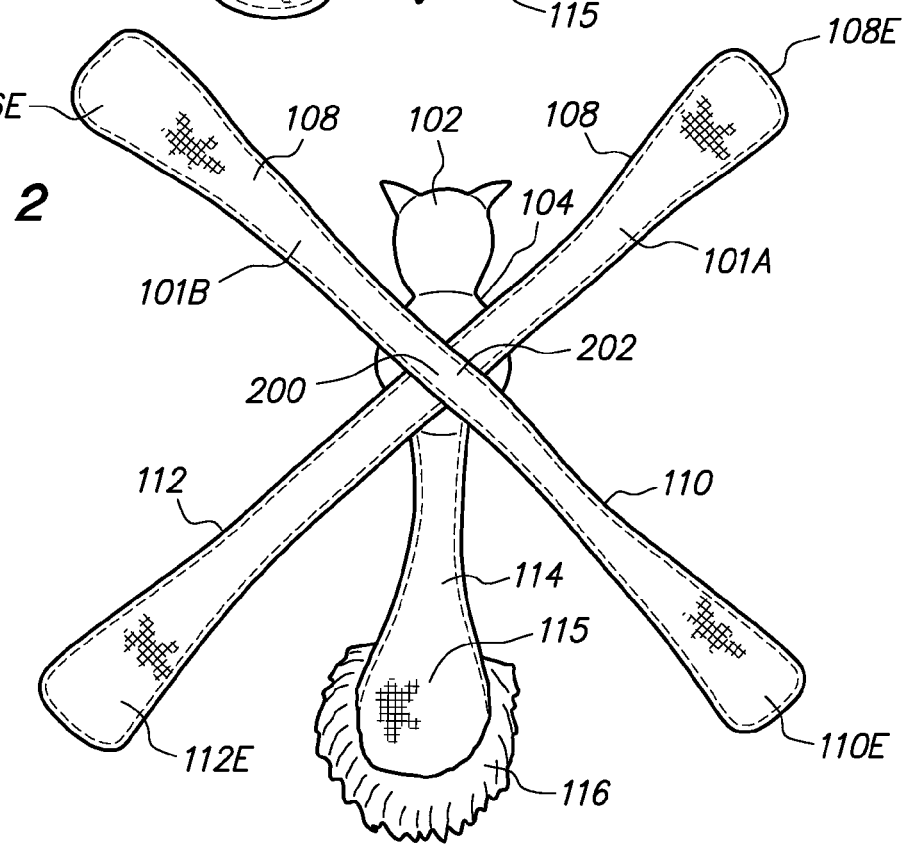
FIG. 2 is a rear elevation view of the pull toy of FIG. 1.

FIG. 1 is a front elevation view of an embodiment of a pull toy. FIG. 2 is a rear elevation view of the pull toy of FIG. 1. In an embodiment, a pull toy 100 comprises a head 102, body 104, a first limb element 101A, a second limb element 101B, and a tail 114. Each of the head 102, body 104, first limb element 101A, second limb element 101B, and tail 114 comprises one or more pieces of sheet material. In an embodiment, 1680 denier nylon is used. However, in other embodiments may use sheet material comprising fibers having a linear density of fiber mass of about 800 Denier or greater or non-synthetic materials, such as canvas sheet, or other cloth materials.

Multiple layers or sheets may be used; in an embodiment, four (4) layers of 1680 D nylon are used for the limb elements. The pieces or sheets may be arranged in top and bottom layers that are joined by perimeter stitching or by a bead of adhesive at the perimeter. When multiple layers are used, multiple layers of stitching may be used. For example, each layer may have an individual set of stitching so that successive layers do not rely for strength upon the stitching that is used for previous layers.

Head 102, body 104, and tail 114 may be formed of a single sheet of material that is formed and sewn such that the head and body are generally spherical and the tail is relatively flat. Alternatively, other structural arrangements of elements may be used as appropriate to simulate or resemble other kinds of animals or objects. In an embodiment, head 102 and body 104 each contain a core element that can withstand dropping, throwing, and chewing. In an embodiment, the core element is a tennis ball; thus, each of the head 102 and the body 104 may contain a tennis ball covered and concealed by the fabric that forms the head and body. Alternatively, the core element may comprise shredded rubber or other synthetic material, fabric, wood, plastic, etc. In other embodiments, the core element is omitted.

In an embodiment, tail 114 comprises a generally fabric element having a top face and a bottom face that are joined by perimeter stitching. Tail 114 may be omitted in an embodiment, and embodiments are not limited to having a tail or a form that simulates an animal or other real-world thing. When present, tail 114 may be integral to the sheet layers that form the body 104 and need not be a separately applied or stitched element. In an embodiment, tail 114 comprises an end 115. In certain embodiments, end 115 is flared, round, pointed, or square. In various embodiments end 115 comprises an air pocket, or may be stuffed with chew-resistant material such as nylon sheeting, rope segments, polyester cloth or ragging, steel wool, etc.

Figure 3:
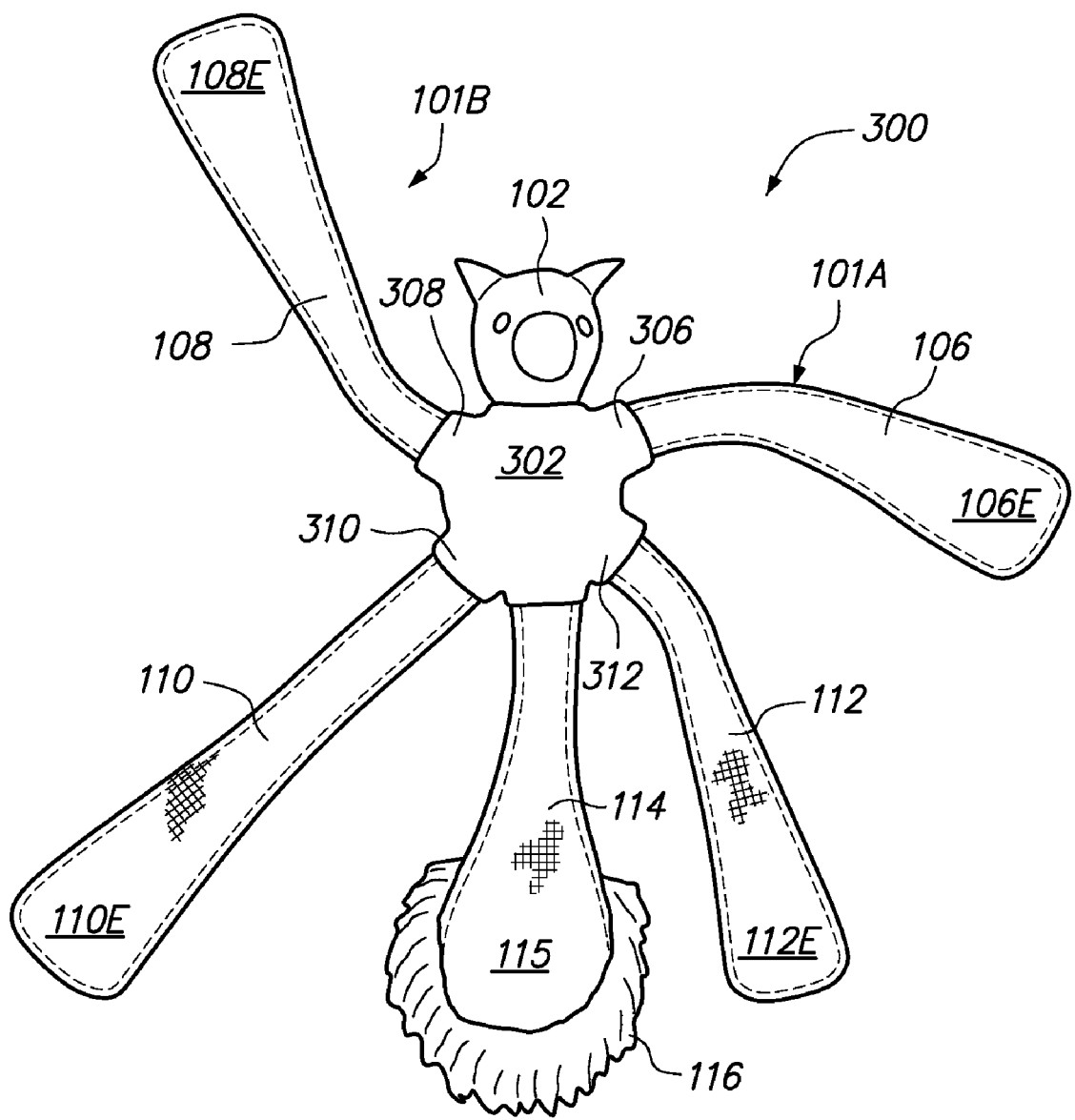
FIG. 3 is a schematic plan view of an alternative embodiment of a pull toy.

Optionally, tail 114 may comprise a section 116 of imitation fur, hair, fabric or other material for the purpose of attracting attention of an animal or pet to which the toy 100 is offered. Tail 114 may be attached to a lower end of body 104 by stitching or adhesive, or the tail may be integrally formed with the body. Embodiments do not require any particular length for tail 114, and the proportions of the tail shown in FIG. 1-3 are not required in other embodiments.

In an embodiment, first limb element 101A comprises the integral combination of a first arm 108 having an end 108E, and a second arm 112 having an end 112E. Similarly, second limb element 101B comprises a third arm 106 having an end 106E and a fourth arm 110 having an end 110E. Each of the ends 108E, 112E, 106E, 110E may comprise a straight, flared or bulbous area that may be stuffed to facilitate gripping by the mouth of an animal such as a dog. Alternatively, the ends 108E, 112E, 106E, 110E may have no stuffing and may simply comprise two layers of fabric with perimeter stitching or other joining means such as adhesive.

In an embodiment, a linear midpoint 200 of the first limb element 101A is joined to a rear surface of the body at a central rear portion of the body as seen in FIG. 2. The second limb element 101B also is joined to the rear surface of the body over the first limb element at a linear midpoint 202 of the second limb element. In an embodiment, when joined to the body, the first and second limb elements 101A, 101B are arranged generally perpendicularly in an "X" formation.

Alternatively, the limb elements 101A, 101B may be joined to the body at angles other than as shown in FIG. 2, and the limb elements when joined to the body may define any angle provided that the limb elements do not directly overlay one another. For example, the second limb element may be joined to the body over the first limb element and the first limb element and the second limb element may define an angle of about 5 degrees to 90 degrees.

The limb elements 101A, 101B may be joined to one another and the body by stitching at midpoints 200, 202. In an embodiment, the stitching comprises nylon thread that is arranged in a box pattern and an "X" pattern for reinforcement and strength.

Elongation of the limb elements 101A, 101B enables two animals to concurrently grip opposite ends of the limb elements. For example, one dog can grip end 106E and another dog can grip end 110E of second limb element 101B to engage in a tug-of-war game. Because the limb elements are formed as continuous elements, pulling hard on opposite ends of a particular limb element will not tear or rip the limb element. Further, separation of the limb element from the body is difficult because pulling force of animals is directed along the length of the limb element and not directly away from the body.

Elongation of the limb elements 101A, 101B also allows a person to grasp and offer the toy 100, by holding one end of a limb element, to an animal with a reduced chance of the animal biting the person as the animal attempt to grasp an end of a limb element. In one embodiment, use of a tear-resistant fabric such as heavy nylon greatly reduces the likelihood that a limb element can be chewed or torn open, and the general absence of stuffing within the limb elements enables the toy 100 to be washed, including in a washing machine, even if a limb element is torn. However, tear-resistant fabric is not required and an embodiment may use materials that are intended to be torn as part of animal play or other use of the toy.

FIG. 3 is a schematic plan view of an alternative embodiment of a pull toy 300 in which a body 302 comprises a plurality of limb extensions 306, 308, 310, 312. In the embodiment of FIG. 3, the same general construction of FIG. 1, FIG. 2 is employed such that the limb elements 101A, 101B are joined to a rear center portion of body 302 in an arrangement of an "X" or other angle as seen in FIG. 2. Unlike FIG. 1, in FIG. 3, the limb extensions 306, 308, 310, 312 are joined to top surfaces of the limb elements 101A, 101B. The embodiment of FIG. 3 provides additional reinforcement of the limb elements to the body 302 and greatly reduces the likelihood of the limb elements separating from the body.

For purposes of illustrating a clear example, FIG. 1-3 show a pull toy that resembles a squirrel. However, the broad mechanical arrangement shown in FIG. 1-3 and described herein may be used for other embodiments that are formed according to any animal design or non-animal design. Further, elements such as the head 102 and tail 114 may be omitted or substituted with other structures such as elements resembling an abdomen, thorax, or other anatomical or non-anatomical structures.

For purposes of illustrating a clear example, FIG. 1-3 show a pull toy that has two limb elements 101A, 101B. However, other embodiments may have any number of limb elements ranging from one to any desired number. For example, a pull toy resembling a spider could have four limb elements corresponding to the eight legs of arachnids.

While FIG. 1 shows that head 102 may comprise markings resembling a face and ear structures, such markings and structures may be omitted in other embodiments. While FIG. 1 shows that body 104 and head 102 may have coloration different than coloration of the limb elements, differences in coloration are not required and no color may be used in other embodiments.

For purposes of illustrating a clear example, FIG. 1-3 show an embodiment in which limb elements 101A, 101B are in the sense that each limb element is longer in comparison to its width. However, the specific proportions shown in FIG. 1-3 for the limb elements are not required in an embodiment, and other embodiments may have limb elements that are wider than shown in the drawings or that are shorter in overall length. Further, in an alternative embodiment, the limb elements 101A, 101B may be joined to body 104 at a point other than a linear midpoint of the limb elements. In such an embodiment, one end of a limb element may extend further from the body 104 than another end of the same limb element or another limb element.

Figure 4:
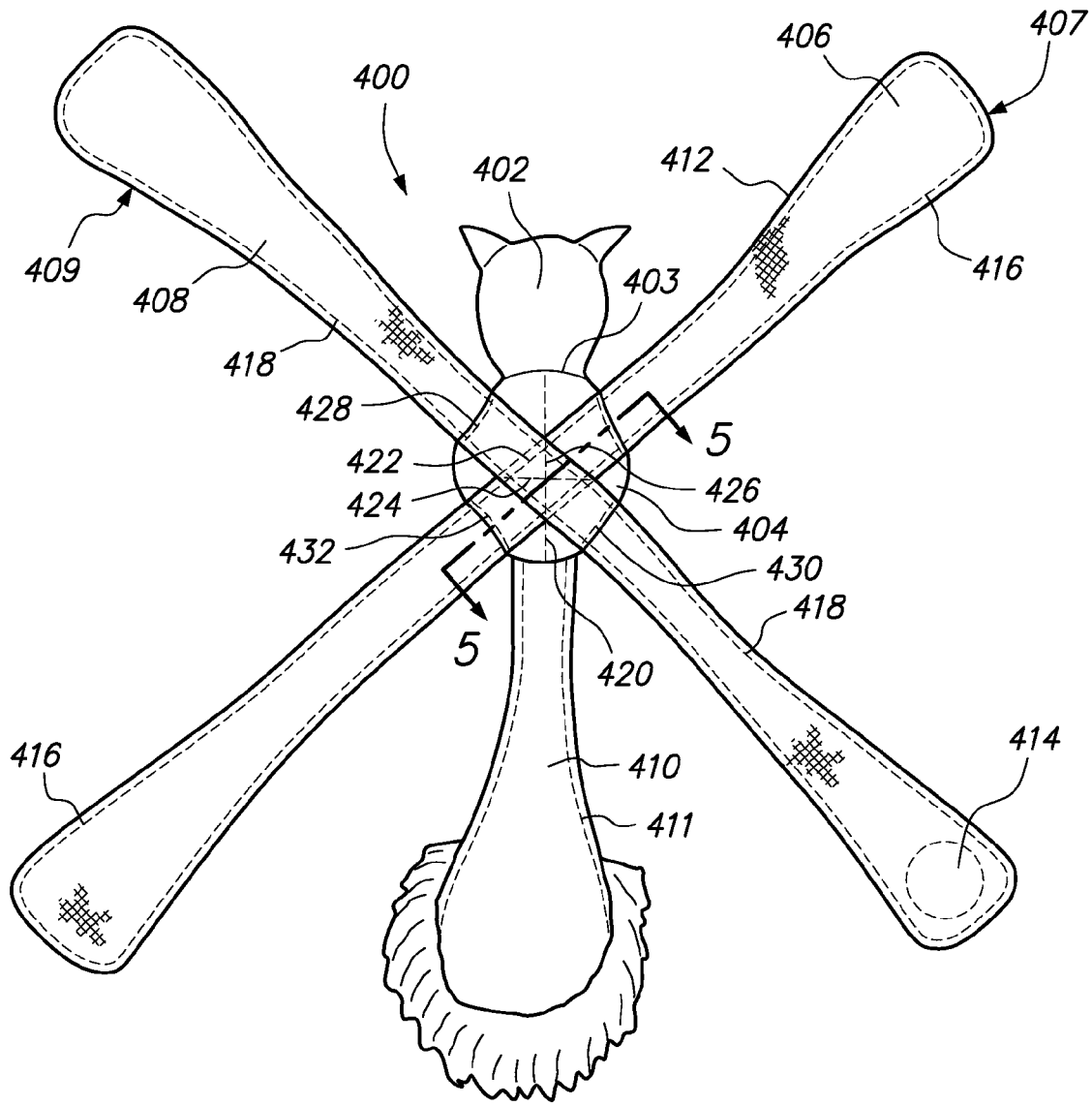
FIG. 4 is a top plan view of another embodiment of a pull toy.
Figure 5:
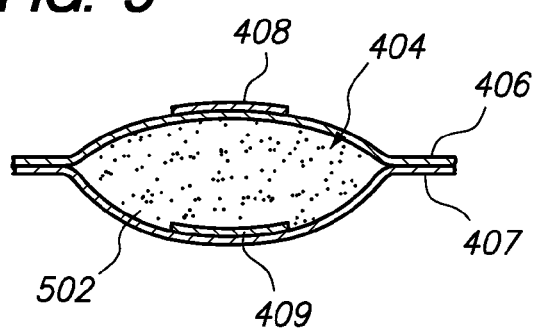
FIG. 5 is a section view of the pull toy of FIG. 4 taken along line 5-5 of FIG. 4.

FIG. 4 is a top plan view of another embodiment of a pull toy. FIG. 5 is a section view of the pull toy of FIG. 4 taken along line 5-5 of FIG. 4.

Referring first to FIG. 4, a pull toy 400 comprises a head 402 joined to a body 404 having a first limb element and a second limb element. A tail element 410 is joined to body 404. In an embodiment, the body 404, the limb elements, and tail element are formed of one or more pieces of sheet material and are joined by stitches, which are illustrated in FIG. 4 using broken lines. Head 402 may join to body 404 using stitches 403. Body 404 may comprise a sheet formed into a generally spherical form around a filling 502 (FIG. 5) such as fiberfill, shredded paper, foam, cloth, rubber, or other fill material, and closed using stitches along line 420. The filling 502 also may comprise a solid core, gel core, liquid core, or gas. The filling 502 may be omitted.

In another embodiment, the sheets are joined or affixed by means other than stitching such as heat sealing or adhesives. Stitching is not required in an embodiment.

The first limb element is joined to the body 404, and the second limb element is joined to the body generally perpendicularly with respect to the first limb element. The term "generally perpendicularly" includes any angle between about 5 degrees and about 90 degrees.

In an embodiment, the first limb element comprises a top sheet 406 joined to a similarly shaped bottom sheet 407 using stitching 416. FIG. 4 is not rendered to scale and the limb elements may have any length as indicated by interruption mark 412. In an embodiment, the second limb element comprises a top sheet 408 joined to a similarly shaped bottom sheet 409 by stitching 418.

One or more pockets may be formed between the sheets 408, 409 and sheets 406, 407, such as at end portions of the limb elements, to accommodate filling, stuffing, or a noisemaker such as a squeaker, bell, rattle or shaker. For example, the second limb element comprises a squeak device 414 in an end portion. A benefit of this approach is that an animal grasping the end portion of the limb element by mouth will compress the end portion and cause the squeak device to squeak, providing amusement or interest. All end portions of both the limb elements may include a noisemaker, stuffing, or a core. However, noisemakers may be omitted and embodiments are not limited to using noisemakers.

In an embodiment, tail element 410 comprises first and second sheets of sheet material that are joined by perimeter stitching 411. An end portion of the tail element may be filled with a filling material or with a noisemaker.

In one embodiment, the first limb element is secured to body 404 by stitching 432 at approximately a perimeter of the body, and the first limb element is secured to the second limb element by stitching 422, 424 which also passes through the body adjacent a center of the body. In an embodiment, additional stitching 426 passes through both limb elements and the body 404 in central position of the body and at approximately a linear midpoint of the limb elements. Portions of the stitching 416, 418 that lie over the body 404 may also pass through the body to further secure the limb elements to the body.

The second limb element may be secured to body 404 by stitching 428, 430 at approximately a perimeter of the body.

Referring now to FIG. 5, in an embodiment the top sheet 406 of the first limb element is joined to a top side of the body 404 and the bottom sheet 407 is joined to a bottom side of the body so that body 404 is held between the two sheets of the first limb element. The two sheets 406, 407 of the first limb element may surround, enclose or overlay the body. Similarly, in an embodiment the top sheet 408 of the second limb element is joined to a top side of the body 404 and the bottom sheet 409 is joined to the bottom side of the body so that the body is also held between the sheets of the second limb element.

In an embodiment, the top sheet 408 passes over the top sheet 406 whereas the bottom sheet 409 passes under the bottom sheet 407. The sheets may pass over one another at approximately a linear midpoint of each sheet and may be joined to the body at approximately the midpoints of each sheet and at a central portion of the body. Alternatively, the positions of the sheets may be interchanged or reversed. For example, top sheet 408 may pass under top sheet 406. In yet another alternative, sheets 408, 409 are placed adjacent to the body 404 and sheets 406, 407 pass over the sheets 408, 409. In yet another alternative, sheet 406 passes over sheet 408, but sheet 407 passes under sheet 409 as shown in FIG. 5.

A result of the configuration shown in FIG. 4, FIG. 5 is that the sheets, stitching and limb elements reinforce one another in a cross-stacked relationship to provide high resistance to separation when the limb elements are pulled.

Any of the head 402, the limb elements, the body 404, and the tail element 410 may comprise a cord, hook, loop, or other means for hanging the pull toy 400 on a peg, shelf, or other storage location.

In any of the embodiments described herein, each of the first limb element and the second limb element comprises two simulated limbs. The limb elements may be elongated and each of the limb elements may comprise a unitary formation of two simulated limbs. In any of the embodiments described herein, the first limb element, the second limb element, and the tail element may comprise five simulated limbs.

In any of the embodiments described herein, when the limbs are formed using sheet material, the sheets forming a limb may be joined directly without stuffing or filling.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A pull toy comprising:
   a body;
   a first limb element that is fixedly joined to the body;

a second limb element that is fixedly joined to the body at an angle with respect to the first limb element;

wherein the second limb element is joined to the body at about a linear midpoint of the second limb element and wherein the first limb element is joined to the body at about a linear midpoint of the first limb element;

wherein the second limb element is joined to the body by joining the second limb element to the first limb element;

wherein the first limb element and the second limb element each comprises a first sheet of a flexible sheet material joined along a perimeter thereof to a second sheet of a flexible sheet material.

2. The pull toy of claim 1, wherein a noisemaker is affixed between the first sheet and the second sheet.

3. The pull toy of claim 1, wherein the body, first limb element, and second limb element comprise a linear density of fiber mass of at least 800 Denier.

4. The pull toy of claim 1 wherein the angle is between 5 degrees and 90 degrees.

5. The pull toy of claim 1 wherein each of the first limb element and the second limb element is elongated and comprises two unitarily formed limbs.

6. The pull toy of claim 1 further comprising a tail element and wherein the first limb element, the second limb element, and the tail element comprise five simulated limbs.

7. The pull toy of claim 1 wherein the first limb element and the second limb element are directly formed without stuffing.

8. A pull toy comprising:
a body;
a first limb element that is joined to the body;
a second limb element that is joined to the body at an angle with respect to the first limb element;
wherein the second limb element is joined to the body at about a linear midpoint of the second limb element and
wherein the first limb element is joined to the body at about a linear midpoint of the first limb element;
wherein the first limb element comprises a first sheet of a flexible sheet material joined along a first perimeter thereof to a second sheet of a flexible sheet material;
wherein the first sheet is joined to the body over a first side of the body and the second sheet is joined to the body over a second side of the body;
wherein the first limb element is joined to the body by stitching that passes through the first sheet, the body, and the second sheet.

9. The pull toy of claim 8, wherein the second limb element comprises a third sheet of a flexible sheet material joined along a second perimeter thereof to a fourth sheet of a flexible sheet material;
wherein the third sheet is joined to the body over the first side of the body and the fourth sheet is joined to the body over a second side of the body.

10. The pull toy of claim 9, wherein the third sheet passes over the first sheet, and wherein the second sheet passes over the fourth sheet.

11. The pull toy of claim 10 further comprising a tail element and wherein the first limb element, the second limb element, and the tail element comprise five simulated limbs.

12. The pull toy of claim 8, wherein a noisemaker is affixed between the first sheet and the second sheet.

13. The pull toy of claim 8, wherein the body, first limb element, and second limb element comprise a linear density of fiber mass of at least 800 Denier.

14. The pull toy of claim 8 wherein the angle is between 5 degrees and 90 degrees.

15. The pull toy of claim 8 wherein each of the first limb element and the second limb element is elongated and comprises two unitarily formed simulated limbs.

16. The pull toy of claim 8 further comprising a tail element and wherein the first limb element, the second limb element, and the tail element comprise five simulated limbs.

17. The pull toy of claim 8 wherein the first sheet and the second sheet are directly joined without stuffing.

18. The pull toy of claim 10 wherein the third sheet and the fourth sheet are directly joined without stuffing.

19. The pull toy of claim 8, wherein the first limb element is joined to the body by joining the first sheet to the second sheet along a first perimeter of the body and a second perimeter of the body opposite the first perimeter.

* * * * *